United States Patent
Hung

(10) Patent No.: US 8,246,282 B2
(45) Date of Patent: Aug. 21, 2012

(54) MULTI-SHANK NAIL

(75) Inventor: Ying-Feng Hung, Lugang Township (TW)

(73) Assignee: Yeun Chang Hardware Tool Co., Ltd., Changhua County (TW)

( * ) Notice: Subject to any disclaimer, the term of this patent is extended or adjusted under 35 U.S.C. 154(b) by 8 days.

(21) Appl. No.: 12/909,829

(22) Filed: Oct. 22, 2010

(65) Prior Publication Data
US 2012/0099946 A1 Apr. 26, 2012

(51) Int. Cl.
*F16B 15/04* (2006.01)
(52) U.S. Cl. .......................... 411/358; 411/448; 411/454
(58) Field of Classification Search .................. 411/358, 411/359, 469, 454, 446, 447, 448
See application file for complete search history.

(56) References Cited

U.S. PATENT DOCUMENTS

| | | | | | |
|---|---|---|---|---|---|
| 1,247,178 | A | * | 11/1917 | Sweeney | 411/454 |
| 4,427,327 | A | * | 1/1984 | Herb | 411/78 |
| 5,069,588 | A | * | 12/1991 | Hasan et al. | 411/439 |
| 5,468,107 | A | * | 11/1995 | Wakai | 411/448 |
| 5,529,424 | A | * | 6/1996 | Neubert et al. | 403/298 |
| 5,651,650 | A | * | 7/1997 | Herb et al. | 411/78 |
| 5,700,119 | A | * | 12/1997 | Wakai | 411/78 |
| 6,565,447 | B2 | * | 5/2003 | Wakai | 470/34 |

* cited by examiner

*Primary Examiner* — Flemming Saether

(57) ABSTRACT

A multi-shank nail has a first shank, a second shank and a washer; wherein both of the first shank and the second shank have an enlarged head at their top ends and a point at their lower ends. The first shank has a flat contact surface along its longitudinal length at an upper portion, and the second shank has a shape of a longitudinally cut nail such that the second shank is capable of corresponding to the contact surface on the first shank. The first shank has an inclined face and an extended portion in sequence below the contact surface. At least one of the first shank or second shank comprises a plurality of notches opposite the contact surface, and the notches make the first shank or second shank easier to bend.

2 Claims, 6 Drawing Sheets

MULTI-SHANK NAIL

BACKGROUND OF THE INVENTION

1. Field of the Invention

The present invention relates to a multi-shank nail, and more particularly to a multi-shank nail that provides an improved securing effect.

2. Description of the Related Art

Currently, expansion screws are often used for securing objects to a wall. But the typical expansion screw is expensive due to its complex structure and manufacturing process. Further, expansion screws are not suitable for fragile materials or foam materials.

Therefore, a multi-shank nail was developed. Please refer to FIG. 6. The multi-shank nail comprises two shanks 30, 300 and a washer 40. The two shanks 30, 300 both have a shape of a longitudinally cut nail, with the two shanks 30, 300 forming a complete, whole nail. The two shanks 30, 300 both have an enlarged head 31 at their top ends and a tapered point 32 at their lower ends. One flat surface of the shank 300 has a protruding point 33. For actual usage, the washer 40 is jacketed onto the two combined shanks 30, 300; when the two shanks 30, 300 are hit downwardly in sequence; the protruding point 33 pushes against and away from the shank 30.

However, the above-mentioned structure has the following drawback: the single protruding point 33 does not provide sufficient separation strength for both shanks 30, 300.

It is thus desirable to provide a multi-shank nail to mitigate and/or obviate the aforementioned problems.

SUMMARY OF THE INVENTION

An objective of the present invention is to provide an improved multi-shank nail.

In order to achieve the above-mentioned objective, a multi-shank nail has a first shank, a second shank and a washer; wherein both of the first shank and the second shank have an enlarged head at their top ends and a point at their lower ends. The first shank has a flat contact surface along its longitudinal length at an upper portion, and the second shank has a shape of a longitudinally cut nail such that the second shank is capable of corresponding to the contact surface on the first shank. The first shank has an inclined face and an extended portion in sequence below the contact surface, and the extended portion has at least one spiraled slot. At least one of the first shank or second shank comprises a plurality of notches opposite the contact surface, and the notches make the first shank or second shank easier to bend.

With the above-mentioned structure, embodiments of the present invention can provide the following benefits: the first shank and the second shank are able to bend away from each other to provide an improved securing effect, and the inclined face provides a gradual pushing angle to enhance the separation effect.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
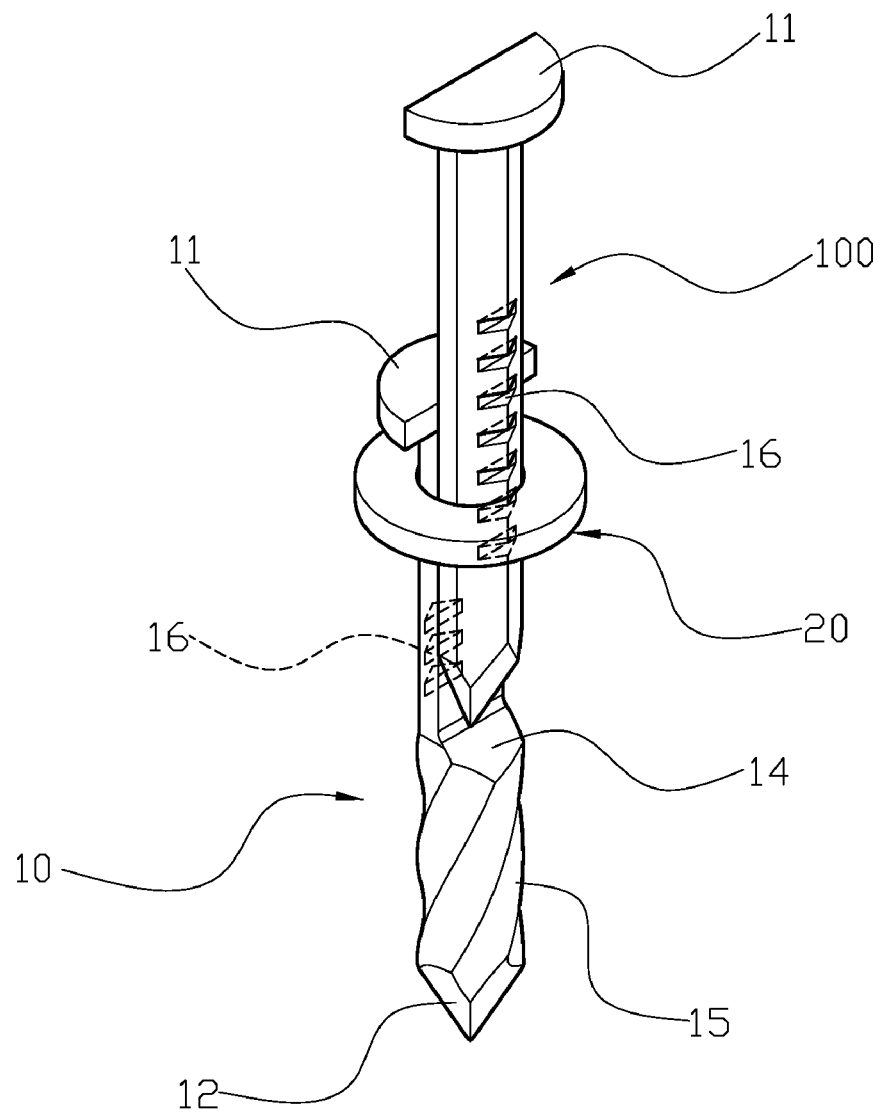
FIG. 1 is a perspective view of an embodiment of the present invention.
Figure 2:
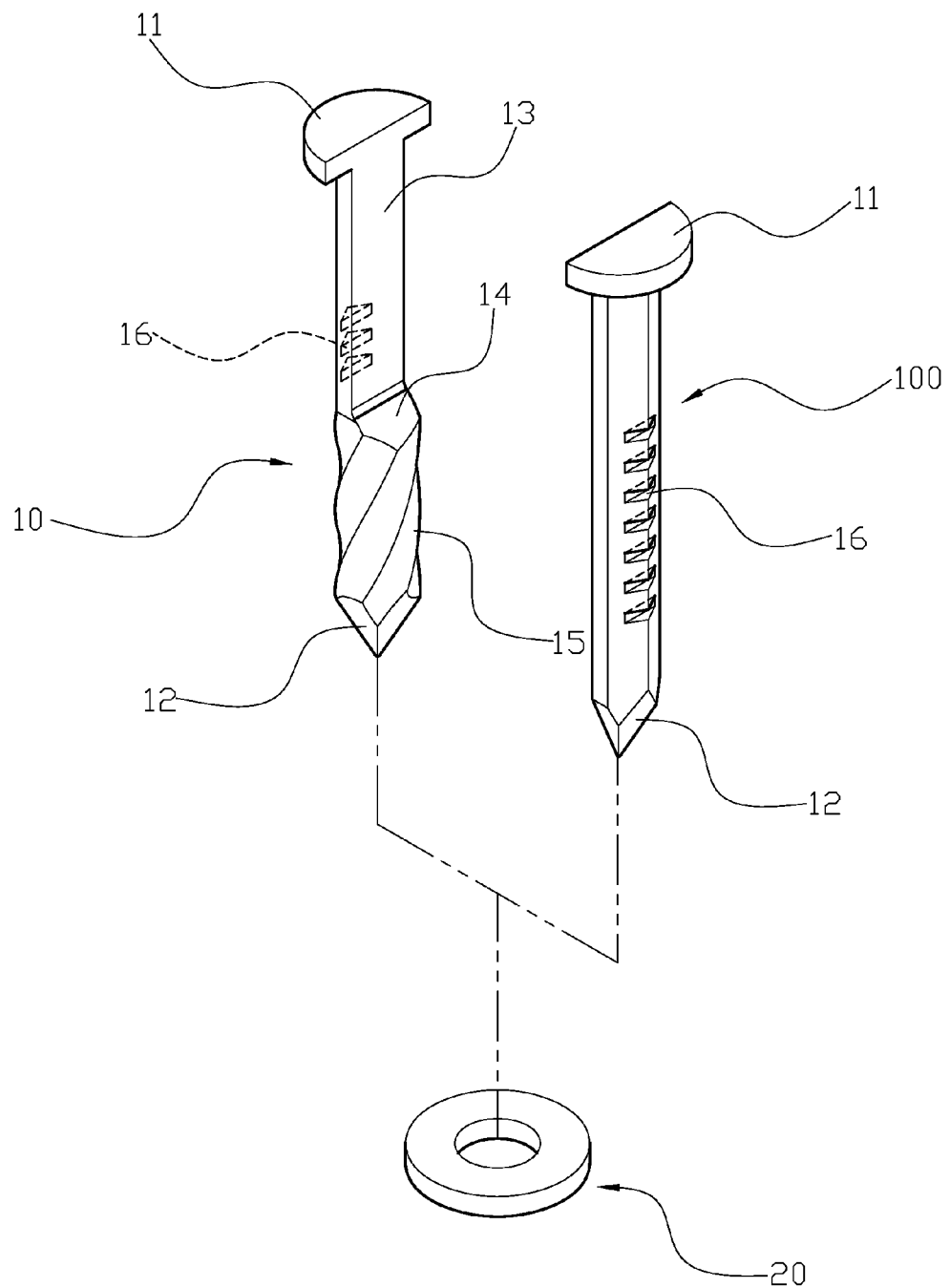
FIG. 2 is a perspective exploded view of an embodiment of the present invention.

First, please refer to FIG. 1 and FIG. 2. A nail comprises a first shank 10, a second shank 100 and a washer 20. Both of the first shank 10 and the second shank 100 have an enlarged head 11 at their top ends and a tapered point 12 at their lower ends. The first shank 10 has a flat contact surface 13 along its longitudinal length along an upper portion, and the second shank 100 has the shape of a longitudinally cut nail such that the second shank 100 is capable of corresponding to the contact surface 13 on the first shank 10. The first shank 10 has an inclined face 14 and an extended portion 15 in sequence below the contact surface 13. The extended portion 15 has a plurality of spiraled slots. The first shank 10 and second shank 100 also comprise a plurality of parallel notches 16 opposite the contact surface 13, and the notches 16 make the first shank 10 and second shank 100 easier to bend.

Figure 3:
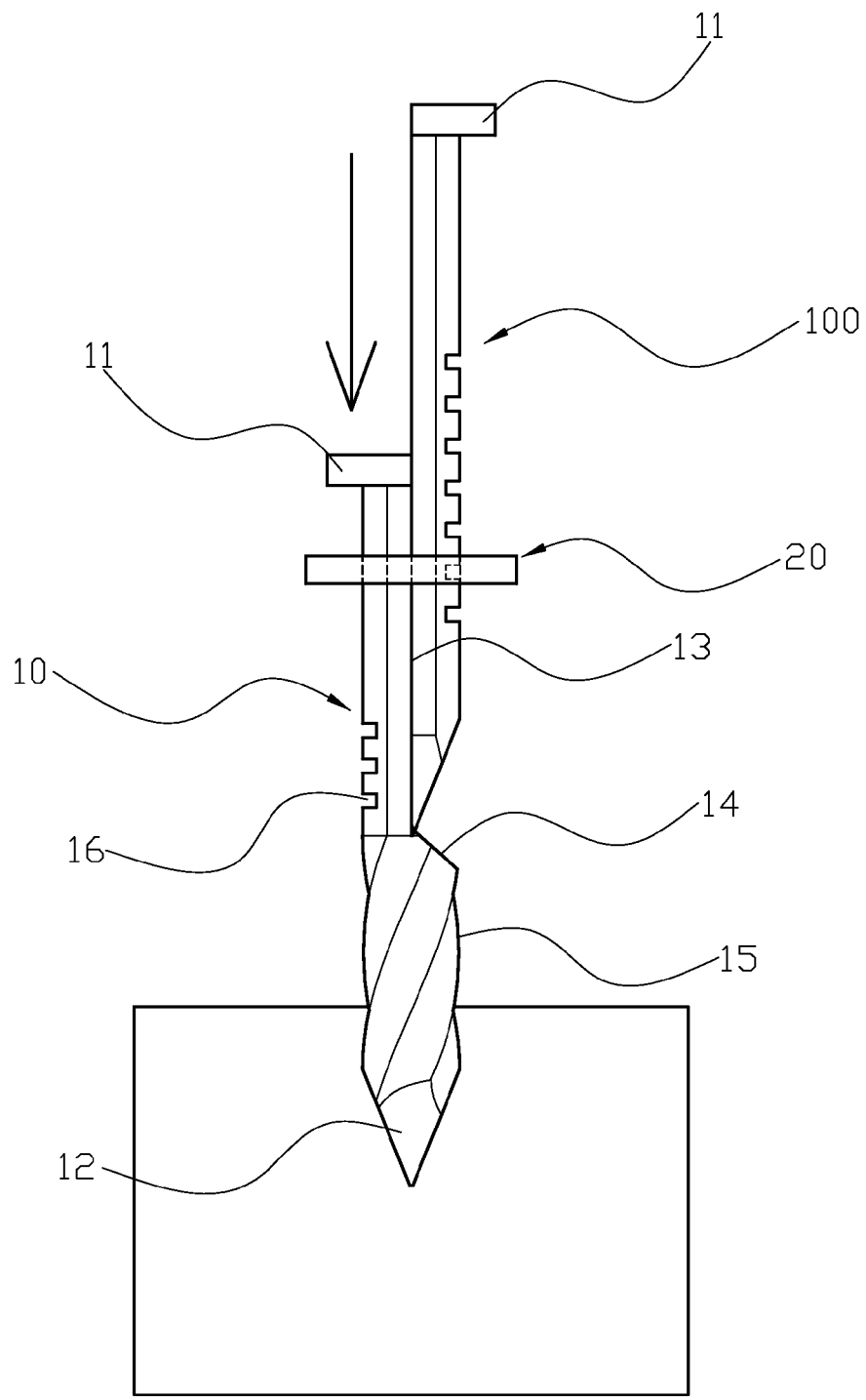
FIG. 3 is a schematic drawing of hitting an embodiment nail according to the present invention.
Figure 4:
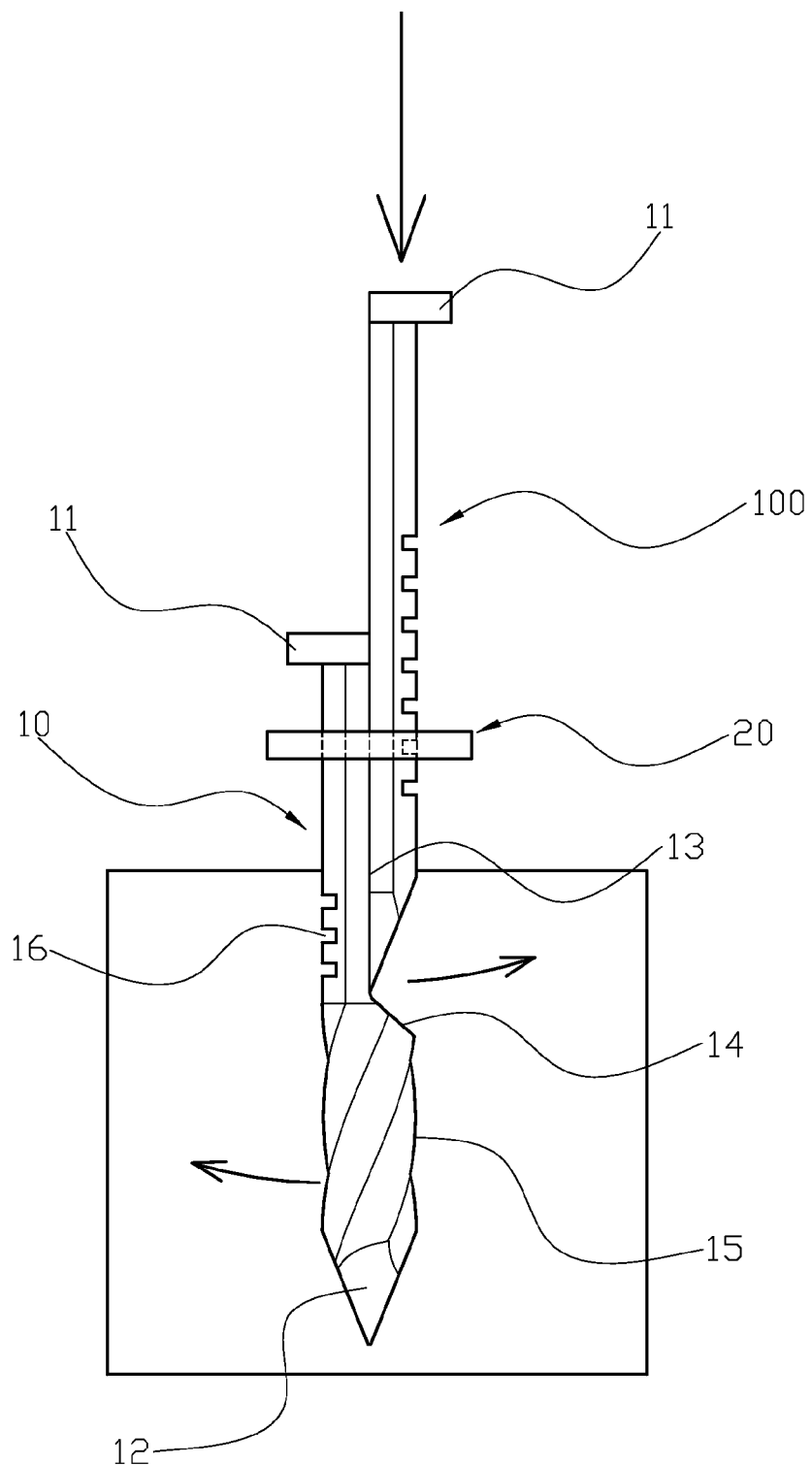
FIG. 4 is another schematic drawing of hitting an embodiment nail according to the present invention.
Figure 5:
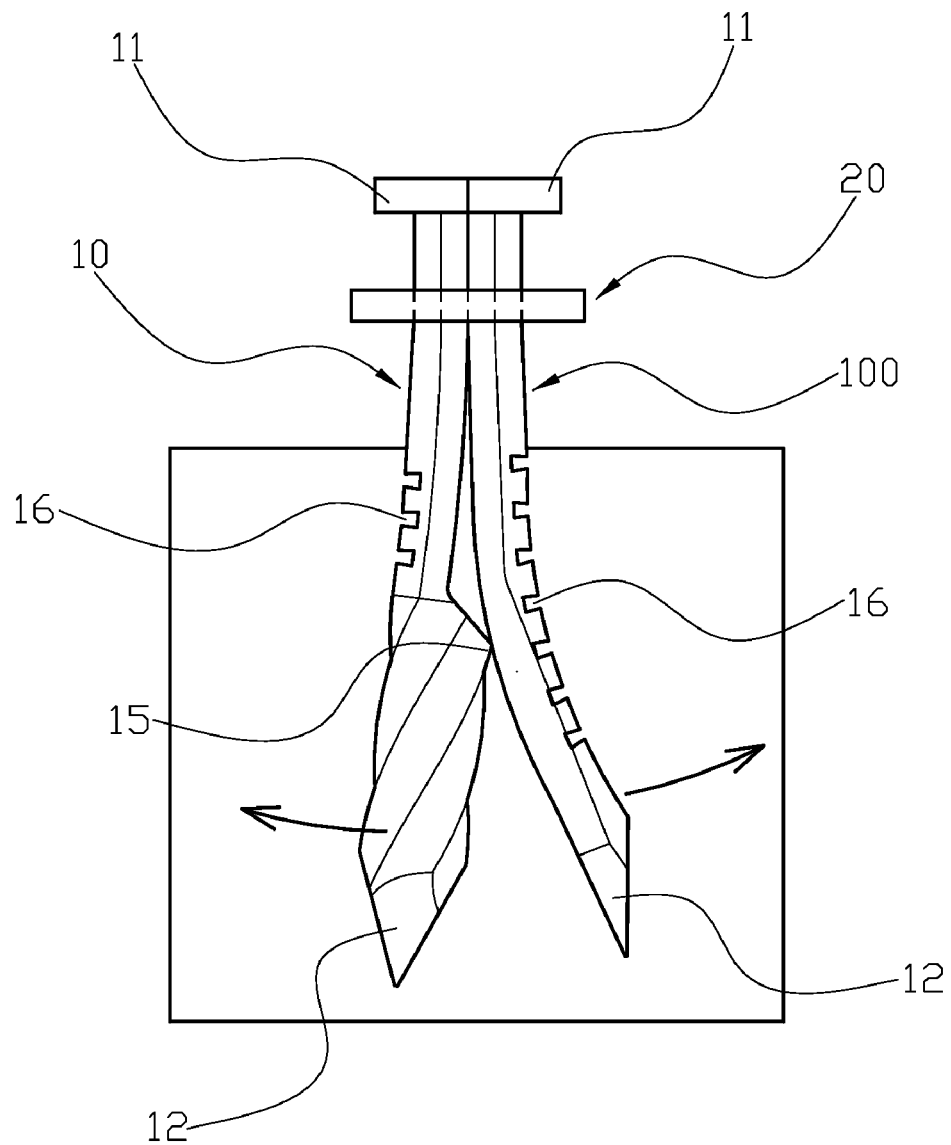
FIG. 5 is a schematic drawing showing first and second shanks separating from each other according to an embodiment of the present invention.
Figure 6:
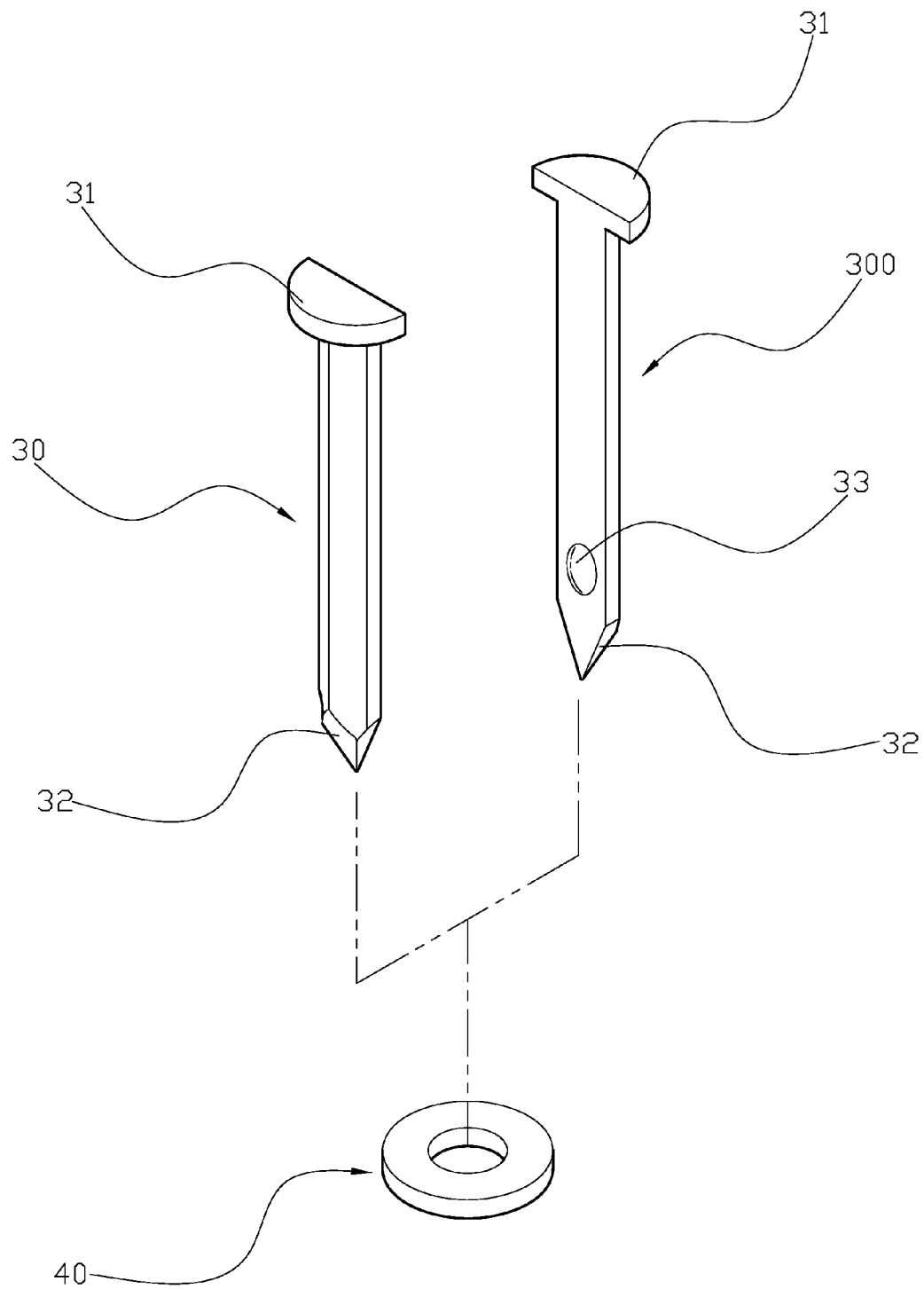
FIG. 6 is a perspective exploded view of a prior art nail.

Please refer to FIG. 3 to FIG. 5. The washer is jacketed onto the first and second shanks 10, 100 to combine the first and second shanks 10, 100 together. When the first shank 10 is hit downwardly, the second shank 100 presses against the contacting surface 13; and when the second shank 100 is hit downwardly, the second shank 100 deflects off the inclined face 14 to push away from the first shank 10, such that the first and second shanks 10, 100 bend away from each other. Since the washer 20 restricts the upper portions of the first and second shanks 10, 100 to combine them together, only the lower portions of the first and second shanks 10, 100 are allowed to bend away from each other. With the securing effect provided by the extended portion 15 and the notches 16 on the first and second shanks 10, 100, the first and second shanks 10, 100 are both capable of bending outwardly for an improved securing effect.

The first shank 10 and the second shank 100 may be made from aluminum, zinc, copper, iron or steel. A multi-shank nail made of aluminum or zinc is suitable for sheet metal; gypsum board; and foam, cotton and fire and sound-proofing walls and other such light-weight materials; a multi-shank nail made of copper is suitable for wood or iron materials; and a multi-shank nail made of steel is suitable for outdoor environments.

With the above-mentioned structure, embodiments of the present invention can provide the following benefits: the first shank 10 and the second shank 100 are able to bend away from each other to provide an improved securing effect, and the inclined face 14 provides a gradual pushing angle to enhance the separation effect.

Although the present invention has been explained in relation to its preferred embodiment, it is to be understood that many other possible modifications and variations can be made without departing from the spirit and scope of the invention as hereinafter claimed.

What is claimed is:

1. A multi-shank nail comprising: a first shank, a second shank and a washer; wherein both of the first shank and the second shank have an enlarged head at their top ends and a point at their lower ends; the multi-shank nail characterized in that:

the first shank has a first flat contact surface along its longitudinal length at an upper portion thereof, the second shank having a shape of a longitudinally cut nail such that the second shank has a second flat contact surface that is capable of corresponding to the first flat contact surface on the first shank, the first shank having an inclined face and an extended portion in sequence below the contact surface, the extended portion comprising at least one spiraled slot;

wherein at least one of the first shank and the second shank comprises a plurality of notches opposite the flat contact surfaces only, the notches configured to make the first shank or second shank easier to bend, and the washer is jacketed onto the first and second shanks to combine the first and second shanks together.

2. The multi-shank nail as claimed in claim 1, wherein the first shank and the second shank are made of aluminum, zinc, copper, iron or steel.

* * * * *